C. L. TAYLOR.
BLOOM SHEARS.
APPLICATION FILED MAR. 16, 1916.
1,207,238.
Patented Dec. 5, 1916.
3 SHEETS—SHEET 3.
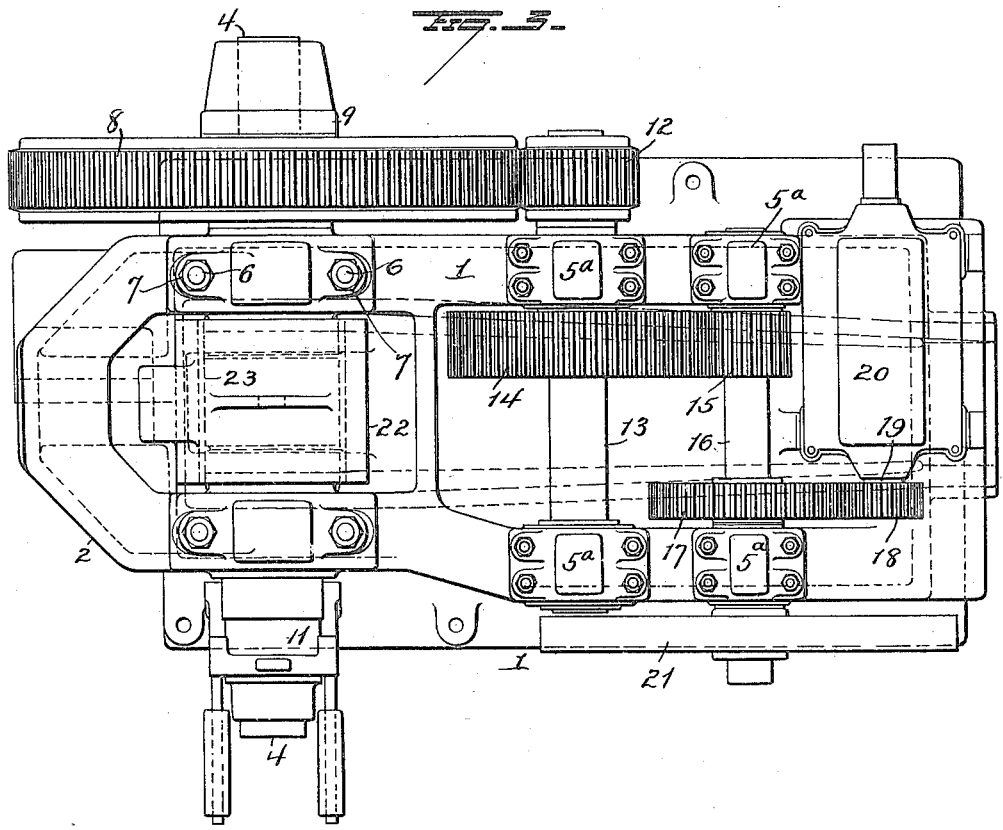
WITNESSES
INVENTOR
C. L. Taylor
By Seymour & Bright Attorneys

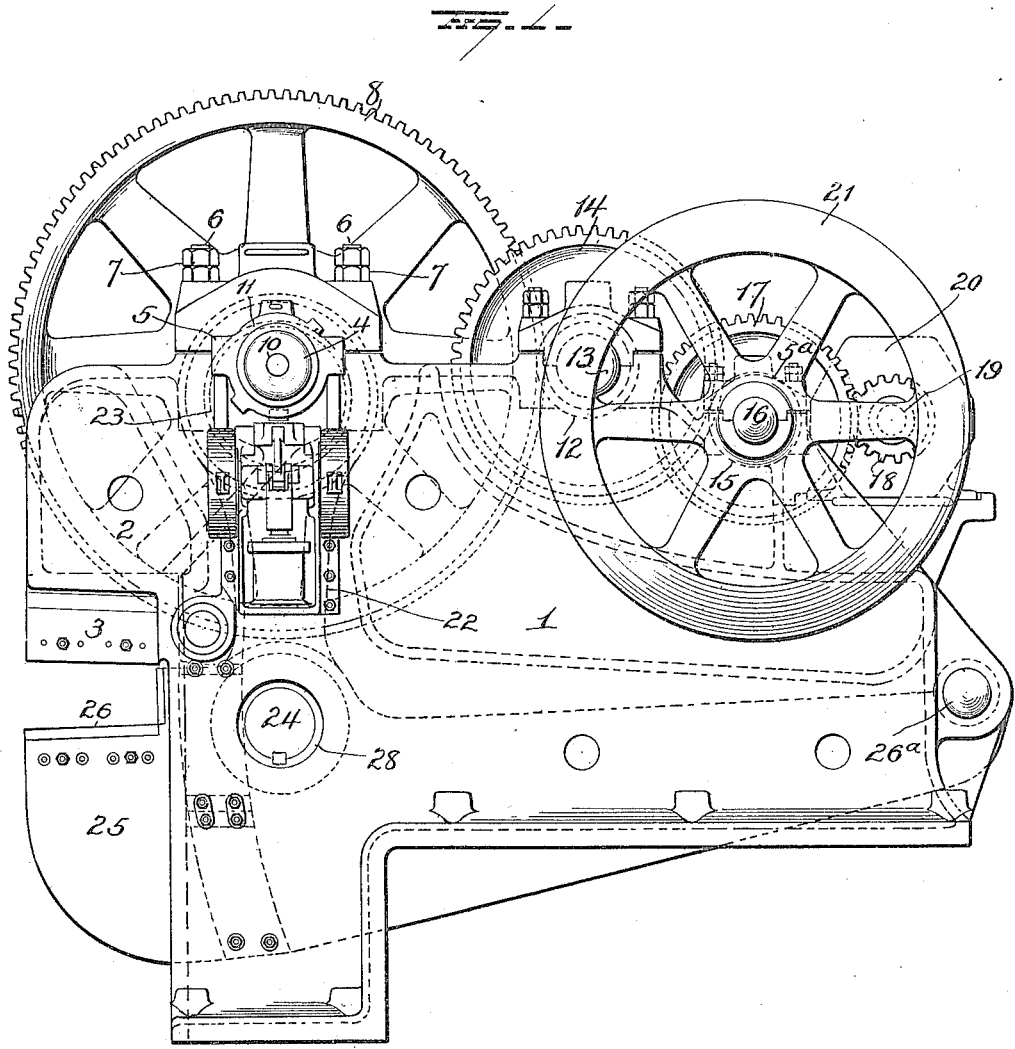

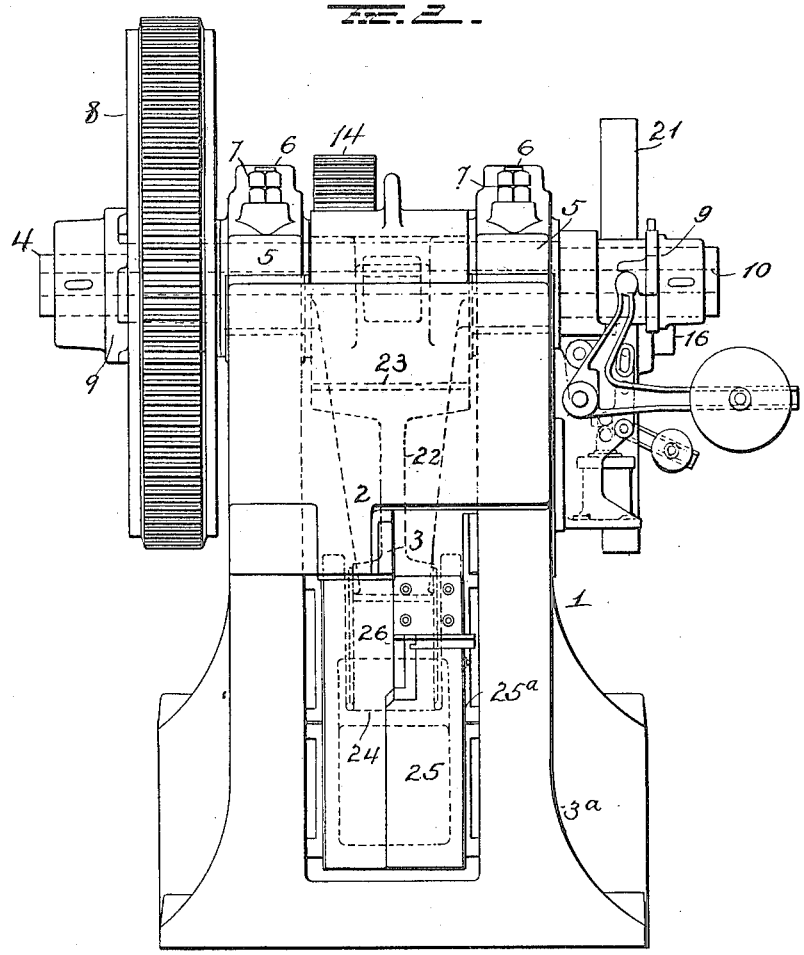

UNITED STATES PATENT OFFICE.

CLARENCE L. TAYLOR, OF ALLIANCE, OHIO, ASSIGNOR TO THE MORGAN ENGINEERING COMPANY, OF ALLIANCE, OHIO.

BLOOM-SHEARS.

1,207,238.      Specification of Letters Patent.      Patented Dec. 5, 1916.

Application filed March 16, 1916. Serial No. 84,627.

*To all whom it may concern:*

Be it known that I, CLARENCE L. TAYLOR, a citizen of the United States, and a resident of Alliance, in the county of Stark and State of Ohio, have invented certain new and useful Improvements in Bloom-Shears; and I do hereby declare the following to be a full, clear, and exact description of the invention, such as will enable others skilled in the art to which it appertains to make and use the same.

My invention relates to an improvement in bloom shears, and it consists in the combination and arrangement of parts as will be more fully explained and pointed out in the claims.

In the accompanying drawings, Figure 1 is a view in side elevation of my improved machine; Fig. 2 is a view in front elevation thereof and Fig. 3 is a view in plan.

1 represents the main frame consisting of a massive steel casting provided at its front end with an overhanging integral portion or nose 2 which is comparatively narrow, and which carries the top or upper knife 3. The front end of the frame is extended downwardly as at 3ª, and the top thereof immediately over said downward extension is provided with half bearings for the main shaft 4, the upper halves 5 of said bearings being removable and held in place by the bolts 6 and nuts 7.

The shaft 4 carries the large gear wheel 8, which is loosely mounted thereon, but which may be locked to the shaft by the clutch 9, of any approved construction, and which is secured to a bar 10 passing centrally through the shaft 4, and connected at its other end to a collar 11, which may be actuated by any suitable devices to shift the clutch to either of its positions. The toothed gear 8 meshes with smaller gear 12 on shaft 13, which has a larger gear 14 meshing with smaller gear 15 on shaft 16, and the latter shaft is provided with a larger gear 17 meshing with the smaller gear 18 on the armature shaft 19 of the motor 20. Shaft 16 also carries the large fly wheel 21. The motor 20 is secured on the rear end of the frame and the shafts 16 and 13, are each mounted in half bearings at the top sides of the frame 1 and are held in place by the upper half bearings 5ª as clearly shown in Figs. 1 and 3.

The frame 1 is open between its sides to receive the gears 14, 15, 17 and 18, and the front end or portion of said frame is also open to receive the link 22, which is mounted at its upper end, in the well known manner on the crank or eccentric 23 on shaft 4, and connected at its lower end to the pin 24 keyed to the lower knife holder 25.

The frame 1 is open at its lower side and also at its front to receive knife holder 25, and the latter, which is in effect a long lever, is pivoted at its rear end to the rear end of frame 1 by the pin 26ª, the pin 24 connecting the link 22 with said lower knife holder being located adjacent the front free end of the latter. The knife holder projects in front of the frame 1 as clearly shown in Fig. 1 and carries the lower knife 26, the upper knife 3 being detachably secured to the overhanging end 2 of the frame 1, and in position of course to coact with the knife 26 on the knife holder 25.

The part of the lever or knife holder 25, at the front end of the frame is of slightly less width than the opening in said frame for the insertion of wearing plates 25ª which take the side thrust of the knife holder 25, and which may be removed and replaced by new ones when worn. The portion of the knife carrier 25 which projects in front of the frame is in a plane to one side of the projecting part 2 of frame 1, so that the knife 26 carried by carrier 25 will be in proper position to coact with knife 3 on projection 2 of the frame 1. The main frame 1 is provided in its sides with an opening 28 through which the pin 24 may be passed while inserting or removing it from the knife holder 25.

The roll table (not shown) which carries the blooms to the cutter, is located adjacent the front end of the frame with its long axis at right angles to the long axis of frame 1, and with its top in a plane slightly above the free edge of the lower knife 26, when the latter is in its depressed or lowermost position, so that the bloom may be freely moved over same and under the forwardly projecting portion 2 of the frame 1 into proper position to be cut.

In the operation of the device, the rotating eccentric 23, through the medium of the link 22, rocks the knife holder 25 on its fulcrum 26ª and carries the lower knife up into the plane of the upper one, thereby severing the bloom or other article between the knives. The fulcrum pin 26ª assists in supporting knife holder 25, but owing to the length of the lever, comparatively little of the stresses fall on the fulcrum pin.

The advantage gained by an upcut shear for heavy work, is that it dispenses with an elaborate depressing table, or a table that will give or yield under the pressure of a descending cutter on the bloom. With this improvement the bloom or piece being cut, is lifted from the table and is not pressed down onto the table as is the case with a downcut shear. Another advantage of this particular type is that the parts carrying the knives are comparatively narrow thus permitting the roller tables at either side to be brought up close to the knives, and the shear is entirely open at one side so that the entire operation of cutting is within easy view of the operator. Again if the piece gets cold and sticks it can be readily removed without dismantling any part of the machine.

It is evident that many slight changes might be resorted to in the relative arrangement of parts shown and described without departing from the spirit and scope of my invention. Hence I would have it understood that I do not wish to confine myself to the exact construction and arrangement of parts shown and described but, Having fully described my invention what I claim as new and desire to secure by Letters-Patent, is:—

1. In bloom shears, the combination of a frame having bearings for the main and driving shafts and a projecting nose carrying a knife, main and driving shafts mounted in said bearings, a knife carrying lever pivoted at its rear end to said frame and projecting at the front beyond the frame and carrying a knife coacting with the knife on the projecting nose, and lifting means carried and actuated by the said main shaft and connected with the knife carrying lever.

2. In bloom shears, the combination of an integral frame having bearings for the main and driving shafts and a projecting nose at its front end, a knife secured to said nose and constituting the upper cutter, main and driving shafts mounted in said bearings, the main shaft having a crank, a knife carrying lever pivoted at its rear end to said frame and projecting at the front end beyond the frame and carrying a knife coacting with the knife on the projecting nose and a link carried by the crank on the main shaft and connected with the knife carrying lever nearer the free end of the latter.

3. In bloom shears, the combination with an integral frame having a projecting integral nose at its front end, a main crank shaft mounted on said frame, driving mechanism and a motor also mounted on the frame, a knife secured to said projecting nose and constituting the upper cutter of the shear, a lever located within the opening at the front below the nose, the said lever being pivoted at its rear end to the frame, removable wearing plates secured within the opening through which the lever projects at the front, a knife secured to the lever and coacting with the knife secured to the nose, and a link connecting the crank and lever for lifting the free end of the latter.

In testimony whereof, I have signed this specification in the presence of two subscribing witnesses.

CLARENCE L. TAYLOR.

Witnesses:
N. O. FETTERS,
MARJORIE MCLAUGHLIN.

Copies of this patent may be obtained for five cents each, by addressing the "Commissioner of Patents, Washington, D. C."